(12) United States Patent
Doblar et al.

(10) Patent No.: US 8,599,909 B2
(45) Date of Patent: Dec. 3, 2013

(54) SERIAL LINK VOLTAGE MARGIN DETERMINATION IN MISSION MODE

(75) Inventors: Drew G. Doblar, San Jose, CA (US);
Dawei Huang, San Diego, CA (US);
Deqiang Song, San Diego, CA (US)

(73) Assignee: Oracle International Corporation, Redwood City, CA (US)

(*) Notice: Subject to any disclaimer, the term of this patent is extended or adjusted under 35 U.S.C. 154(b) by 603 days.

(21) Appl. No.: 12/850,535

(22) Filed: Aug. 4, 2010

(65) Prior Publication Data

US 2012/0033685 A1 Feb. 9, 2012

(51) Int. Cl.
*H04B 3/46* (2006.01)

(52) U.S. Cl.
USPC ........... 375/224; 375/232; 375/233; 375/252; 375/350

(58) Field of Classification Search
USPC .......................... 375/224, 232, 233, 252, 350
See application file for complete search history.

(56) References Cited

U.S. PATENT DOCUMENTS

| | | | |
|---|---|---|---|
| 6,870,881 B1 | 3/2005 | He | |
| 7,242,712 B1 | 7/2007 | Katic | |
| 7,646,323 B2 | 1/2010 | Pickering | |
| 2005/0025228 A1* | 2/2005 | Stonick et al. | 375/232 |
| 2008/0187037 A1 | 8/2008 | Bulzacchelli et al. | |
| 2010/0246693 A1* | 9/2010 | Ushio et al. | 375/257 |

OTHER PUBLICATIONS

Kasturia, Sanjay, "Techniques for High-Speed Implementation of Nonlinear Cancellation" IEEE Journal on Selected Areas in Communications, vol. 9, No. 5, Jun. 1991, pp. 711-717.

* cited by examiner

*Primary Examiner* — Kabir A Timory
(74) *Attorney, Agent, or Firm* — Marsh Fischmann & Breyfogle, LLP; Robert G. Crouch

(57) ABSTRACT

This disclosure describes systems and methods for determining a voltage margin (or margin) of a serializer/deserializer (SerDes) receiver in mission mode using a SerDes receiver. This is done by time-division multiplexing a margin determination and a tap weight adaptation onto the same hardware (or software, or combination of hardware and software). In other words, some parts of a SerDes receiver (e.g., an error slicer and an adaptation module) can be used for two different tasks at different times without degrading the effectiveness or bandwidth of the receiver. Hence, the disclosed systems and methods allow a SerDes receiver to determine the SerDes margin in mission mode and without any additional hardware or circuitry on the receiver chip.

20 Claims, 8 Drawing Sheets

SERIAL LINK VOLTAGE MARGIN DETERMINATION IN MISSION MODE

BACKGROUND OF THE INVENTION

In many of today's integrated circuits (IC's), serializer/deserializer (SerDes) circuits are implemented to enable the IC's to exchange information with each other and with other components at very high data rates. The SerDes circuits generally include a transmitter and a receiver. Typically, information is sent from a transmitter on one IC to a receiver on another IC through a series of analog pulses. Specifically, to send a digital bit of information, a transmitter determines whether the bit that it wants to send is a digital 1 or a digital 0. If the bit is a digital 1, the transmitter generates an analog signal (which may be made up of a single signal or a pair of differential signals) having a positive voltage. If the bit is a digital 0, the transmitter generates an analog signal having a negative voltage. After generating the analog signal, the transmitter sends the analog signal as a pulse having a certain duration to the receiver along a communications link. Upon receiving the analog signal, the receiver determines whether the analog signal has a positive voltage or a negative voltage. If the voltage is positive, the receiver determines that the analog signal represents a digital 1. If the voltage is negative, the receiver determines that the analog signal represents a digital 0. In this manner, the transmitter is able to provide digital information to the receiver using analog signals.

Ideally, the receiver receives analog pulses that closely resemble the analog pulses that were sent by the transmitter. Unfortunately, due to a pulse response effect that is experienced at high data rates, called intersymbol interference (ISI), this ideal cannot be achieved. Instead, neighboring pulses 'smear' into neighboring pulses, and it is often difficult for the receiver to determine whether the received analog signal represents a digital 1 or a digital 0.

To elaborate upon the concept of a pulse response, reference will be made to the sample pulse response shown in FIGS. 1A and 1B. FIG. 1A shows an example of what may be received by a receiver in response to a single positive-voltage pulse (representing a digital 1) sent by the transmitter. In the example shown in FIG. 1A, the pulse is sent by the transmitter in time interval t−4 and received by the receiver four time intervals later beginning with time interval t. Notice that even though the transmitter sent a pulse lasting only a single time interval, the receiver does not receive that pulse in just a single time interval. Instead, the receiver receives an analog signal that lasts for several time intervals. During time interval t, the received signal has a magnitude of h0. During the next time interval (interval t+1), the received signal magnitude drops to h1. During the next several time intervals, the received signal magnitude drops to h2, then to h3, then to h4, and so on. Thus, even though the transmitter sent a pulse lasting only one time interval, the receiver receives a signal that lasts for many time intervals.

Because of this pulse response effect, a pulse sent in one time interval has a tail that affects pulses sent in future time intervals. When pulses are sent in rapid succession, the tails of various pulses overlap and add together. Thus, the receiver rarely sees just the original pulse. Rather every pulse also arrives at the same time as the tails of various other pulses. Since each pulse is either positive or negative, and thus each tail either adds to or subtracts from the amplitude of an actual pulse, the received signals can vary greatly from the actual pulse height.

To illustrate, suppose that the transmitter sends another positive-voltage pulse in time interval t−3, and that this pulse is received by the receiver beginning in time interval t+1. During time interval t+1, the receiver would sense the h0 voltage of the pulse sent in time interval t−3. The receiver would also sense the h0 voltage of the pulse previously sent in time interval t−4. Suppose further that the transmitter sends another positive-voltage pulse in time interval t−2, and that this pulse is received by the receiver beginning in time interval t+2. During time interval t+2, the receiver would sense the h0 voltage of the pulse sent in time interval t−2. The receiver would also sense the h1 voltage of the pulse previously sent in time interval t−3. In addition, the receiver would sense the h2 voltage of the pulse previously sent in time interval t−4. Thus, the voltage sensed by the receiver at time interval x+2 is an accumulation of the effects of the pulses sent at time intervals t−4, t−3, and t−2 (and even pulses sent at time intervals before t−4). As this example shows, when the receiver senses a voltage during a time interval, it does not sense the effect of just one pulse but the accumulation of the effects of multiple pulses. This distortion may generally be referred to as "intersymbol interference" (ISI). Severe ISI may prevent receivers from distinguishing symbols (an electronic signal representing a digital bit) and consequently disrupt the integrity of received signals in a communications link.

FIG. 1A shows the pulse response for a single positive-voltage pulse. The pulse response for a single negative-voltage pulse (representing a digital 0) is shown in FIG. 1B. Notice that the pulse response of FIG. 1B is similar to the pulse response of FIG. 1A except that the voltages are negative instead of positive. Thus, as shown by FIGS. 1A and 1B, the effect that a pulse has on future pulses will depend on whether that pulse is a positive-voltage pulse (representing a digital 1) or a negative-voltage pulse (representing a digital 0). If a pulse is a positive-voltage pulse, it will add to the voltages of future pulses. Conversely, if the pulse is a negative-voltage pulse, it will subtract from the voltages of future pulses.

As can be seen from the above discussion, a pulse response can significantly affect the signals that are received by a receiver. Thus, it is highly desirable in many implementations to ascertain the pulse response effect that is experienced by a receiver. Armed with knowledge of the pulse response, it may be possible to compensate for its effects (e.g., via decision feedback equalization). It may also be possible to use the pulse response information to adjust the parameters of the transmitter and/or receiver and perhaps even other components to improve the overall performance of the transmission/reception process. These and other uses of the pulse response information are possible. A point to note is that a pulse response is a characterization of the link performance of the communications link to which a receiver is coupled. Because each receiver is coupled to a different communications link, each receiver may and most likely will experience a different pulse response effect. Thus, a pulse response is determined on a per receiver/communications link basis.

A pulse response for a particular receiver/communications link may be determined by sending a set of predetermined analog pulses (representing a predetermined bit pattern) from a transmitter to a receiver along that communications link, and capturing a waveform of the signals actually received by the receiver. Once the waveform is captured, it can be processed and compared with an ideal waveform to derive a pulse response for the receiver/communications link. The difficult part of this process, however, is capturing the waveform in a practical and feasible manner.

One possible approach to capturing the waveform is to implement sufficient sampling and storage components on each receiver to enable the receiver to capture an oversampled waveform for the signals received by the receiver. To illustrate how this may be done, suppose that a predetermined 128 bit pattern is sent by a transmitter to a receiver over 128 time intervals. Suppose further that it is desirable for the receiver to oversample the signals received by the receiver 48 times (i.e. take 48 samples of the incoming signals per time interval). To capture such a waveform, the receiver would need a sampling clock signal that is 48 times faster than the incoming data clock. During each time interval, the receiver would sample the analog signal received during that time interval 48 times. For each sample, the receiver would sense an analog signal and convert it into a corresponding x-bit (e.g. 4-bit) digital value. Each x-bit digital value would be stored in a register. At the end of the 128 time intervals, the receiver will have captured all of the sample values needed to form an oversampled waveform for the incoming signals.

A problem with this approach, however, is that it is quite resource intensive. In order to capture the entire oversampled waveform, the receiver would need 48×128 or 6,144 x-bit registers just to store all of the digital sample values. In addition, the receiver would need to have components for implementing the sampling and storage functions. These components and storage consume a significant amount of chip space. In a large scale IC (e.g. a microprocessor), which can comprise a very large number of receivers, chip space is precious, and in most implementations, it is not practical for each receiver to consume a large amount of chip space. Additionally, using excess chip space can have parasitic effects on the communications link (e.g., capacitive effects can act as a low pass filter). Because of these and other practical considerations, this approach to capturing an oversampled waveform cannot be feasibly implemented in most applications.

One technique for reducing the effect of ISI is to use an adaptive equalizer such as a decision feedback equalizer (DFE). A DFE may be operative to compensate for ISI by utilizing digital filtering techniques. For example, when a pulse response for a communication link is known, a DFE may include a plurality of taps (e.g., 2 taps, 5 taps, or the like) that are used to cancel the effects (e.g., reduce the effects from h1, h2, h3, etc.) of previously sent bits on a present bit. The taps or coefficients for a DFE may be generated using any number of adaptation processes, and may be implemented in any suitable manner.

The importance of accurate data reception motivates communication link designers to design systems that are able to tolerate ISI and other types of noise. One quality characteristic that may be used is referred to as voltage margin or simply "margin." Voltage margin characterizes the range of voltage and timing values for which a given receiver will properly determine input signals. That is, the degree to which the voltage and time can vary without introducing error is termed the "margin" for the communications link.

SUMMARY OF THE INVENTION

This disclosure describes systems and methods for determining a voltage margin (or margin) of a SerDes receiver in mission mode using a traditional SerDes receiver. In one aspect a method of measuring a voltage margin for a serializer/deserializer is disclosed. The method includes comparing a filtered analog pulse stream to a first reference voltage, and comparing the filtered analog pulse stream to a second reference voltage. The first and second reference voltages can be initially equal to each other (e.g., 0V). However, the second reference voltage increases in magnitude (i.e., an increasing or decreasing voltage relative to 0V). A magnitude of the second reference voltage is identified when the comparing operations produce unequal outputs.

Another aspect discloses a serializer/deserializer (SerDes) receiver. The receiver includes first and second comparison modules and an adaptation module. The first comparison module compares a filtered analog pulse stream to a first reference voltage and generates a first output. The second comparison module compares the filtered analog pulse stream to a second reference voltage that is increasing in magnitude and generates a second output. The second reference voltage is initially equal to the first reference voltage. The adaptation module identifies a voltage margin of the SerDes as a magnitude of the second reference voltage at the point when the first and second outputs are unequal.

Another aspect disclosed a machine-implemented method for operation a serializer/deserializer (SerDes) receiver. The method includes receiving a serial analog pulse train, where each analog pulse in the pulse train represents a digital bit. The method also includes filtering the serial analog pulse train to remove intersymbol interference and generating a filtered analog pulse train. The method further includes identifying a polarity of each pulse in the filtered analog pulse train and generating a decision data stream based on the identified polarities. The method also includes using a slicer and an adaptation module to analyze the filtered analog pulse train and identify a voltage margin for the SerDes. During at least some of the pulses, this determination of the voltage margin is performed concurrently with the identifying of pulse polarities. The method further includes transforming the decision data stream in a parallel data stream, and transmitting the parallel data stream.

BRIEF DESCRIPTION OF THE DRAWINGS

For a more complete understanding of the present invention and further advantages thereof, reference is now made to the following detailed description taken in conjunction with the drawings in which.

DETAILED DESCRIPTION

This disclosure describes systems and methods for determining a voltage margin (or margin) of a SerDes receiver in mission mode using a traditional SerDes receiver. In mission mode the SerDes receiver receives a serial data stream from a SerDes transmitter and deserializes the serial data stream so that it can be transmitted as a parallel data stream. Determining a margin at the same time is done by time-division multiplexing a margin determination and a tap weight adaptation onto the same hardware (or software, or combination of hardware and software). In other words, some parts of a SerDes receiver (e.g., an error slicer and an adaptation module) can be used for two different tasks at different times without degrading the effectiveness or bandwidth of the receiver. Hence, the disclosed systems and methods allow a SerDes receiver to determine the SerDes margin in mission mode and without any additional hardware or circuitry on the receiver chip.

Figure 3:
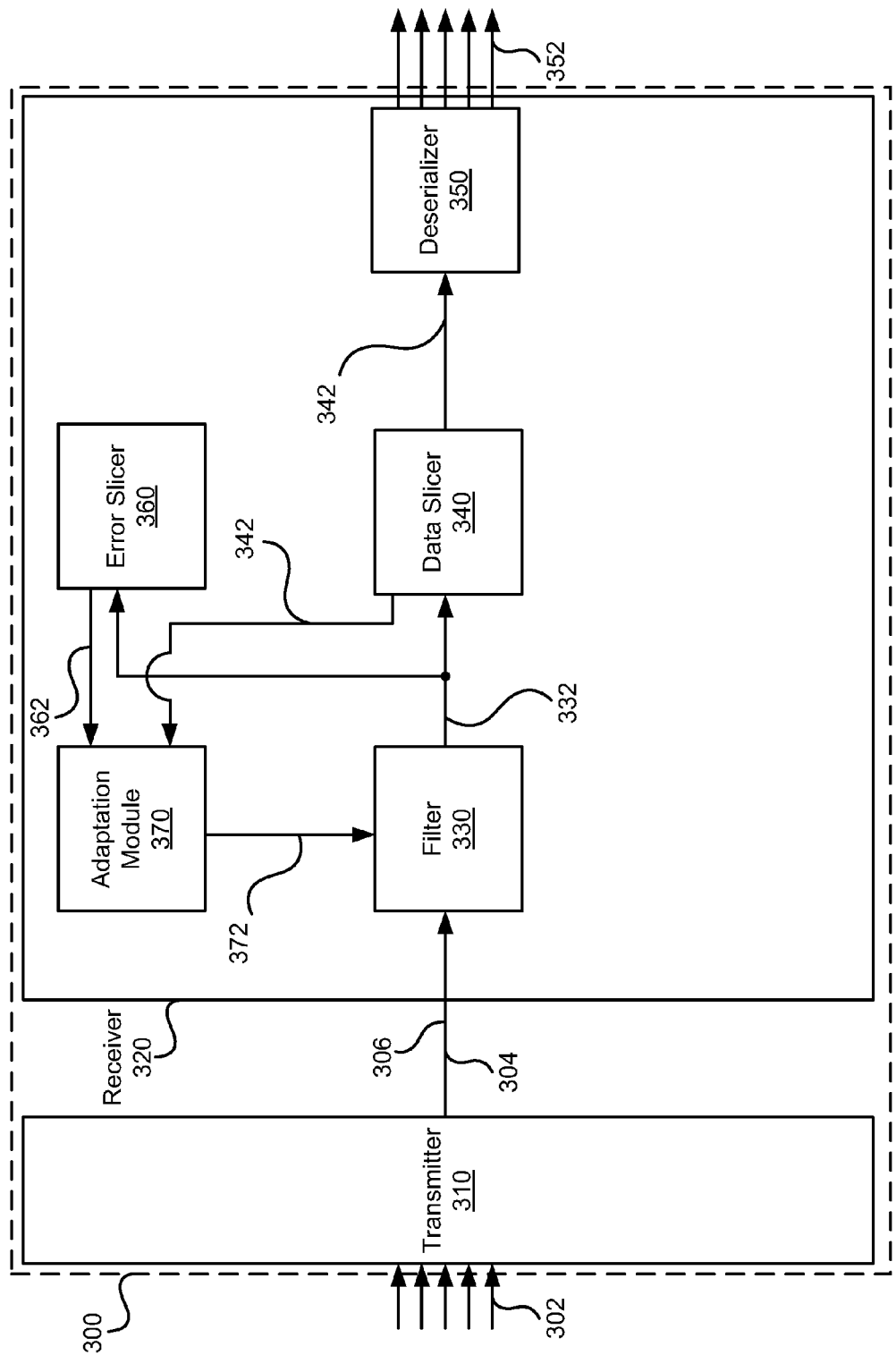
FIG. 3 illustrates an embodiment of a SerDes receiver.

To better understand how this is done, an overview of traditional SerDes operation will be described. While FIG. 3 illustrates an embodiment of a SerDes according to this disclosure, FIG. 3 can also be used to assist in describing operation of a traditional SerDes. The SerDes 300 includes a transmitter 310 for receiving a parallel data stream 302 from an arbitrary device such as a field programmable array chip (FPGA). The parallel data stream 302 includes a plurality of symbols (representations of digital bits). The transmitter 310 serializes the parallel data stream 302 to form a serial data stream 304 and transmits it to a receiver 320 via a serial communications link 306 in analog form. A filter 330 removes a portion of intersymbol interference (ISI) from the symbols in the serial data stream 304 to produce a filtered signal 332. This filtering enables a data slicer 340 and an error slicer 360 to more accurately analyze the symbols in the serial data stream 304. A slicer takes an analog signal at its input and determines what digital value the input signal is meant to represent. The slicer outputs a voltage that other devices will read as a digital value. In other words, a slicer can determine whether an input signal is more likely to represent a digital 1 or a digital 0. For instance, if an analog device transmits a +1V signal to represent a digital 1 and during transmission to a slicer the +1V signal is distorted and arrives as only +0.2V, the slicer can output a +1V signal. In an embodiment, a slicer is a comparison module—a device, or logic block, that compares two input voltages, determines which is larger, and produces an output indicative of which inputs voltage is larger. In an embodiment, a slicer is a comparator. The data slicer 340 makes decisions about each symbol in the filtered signal 332 and passes these decisions 342 to a deserializer 350. The deserializer converts the decisions 332 into a parallel form and transmits them as a parallel data stream 352 to an arbitrary device (e.g., another FPGA).

Figure 1A:
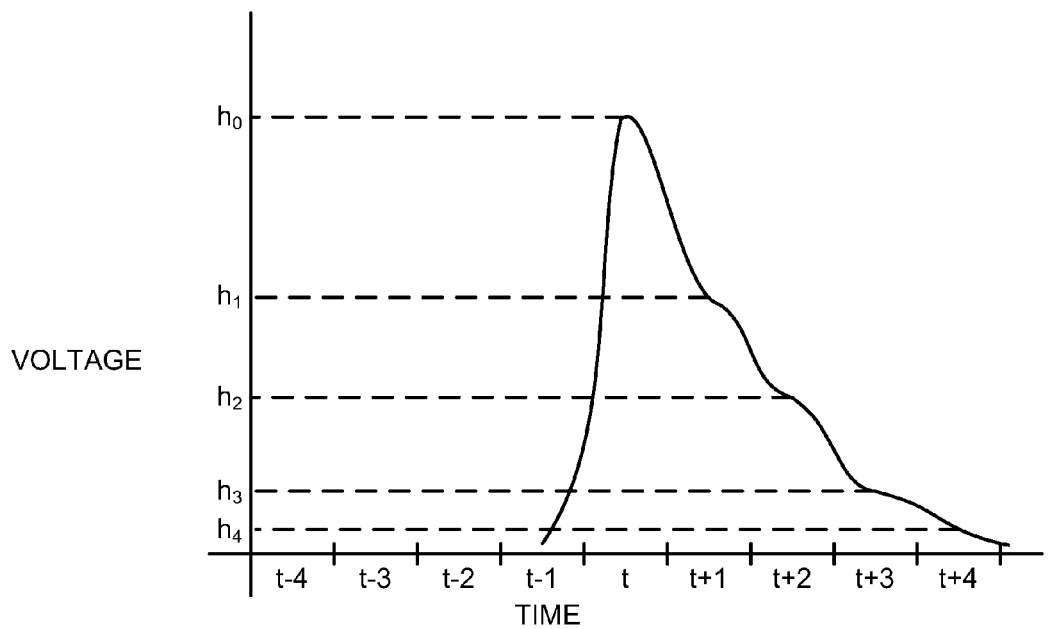
FIG. 1A illustrates an embodiment of a positive pulse in a serial data stream.
Figure 1B:
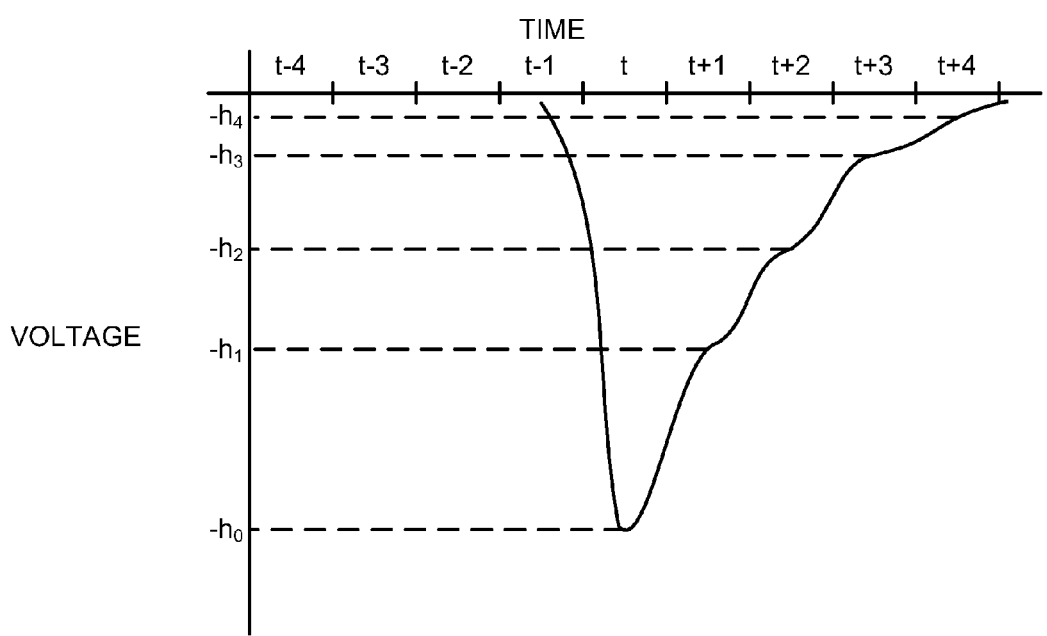
FIG. 1B illustrates an embodiment of a negative pulse in a serial data stream.

As noted, the filter 330 removes a portion of ISI from the symbols in the serial data stream 304. In an embodiment, the filter 330 removes a portion of ISI by subtracting a tap sum 372 from the symbols in the serial data stream 304. The tap sum can be determined in a number of different ways, but important to these determinations is how tap weights (e.g., h1, h2, h3, and h4 in FIGS. 1A and 1B) are determined. Tap weights characterize the amplitude of the tail of a pulse some time after the pulse has arrived. Tap weights remain relatively constant over time, only changing on the order of every one million pulses. To maintain the accuracy of the filter 330, tap weights are updated (or adapted) with information gleaned from every received pulse. However, since tap weights change very slowly, taps adaptation can be paused or disabled for short periods of time without a noticeable affect on the filter accuracy.

With this knowledge in hand, the present disclosure recognizes that taps adaptation can be paused or disabled for short periods of time to allow the error slicer 360 and the adaptation module 370 to engage in margin determination. During these pauses, the tap weights are not updated, but they are still available for calculating the tap sum 372 since they can be stored/retrieved from a memory. As long as the ratio of time in which taps are updated to the time in which updating is paused remains small, (e.g., $10^2/1$, $10^3/1$, $10^6/1$, $10^9/1$, to name a few) the data slicer 340 will continue to make accurate decisions with acceptably low error rates. Since error rates are related to bandwidth, the present disclosure allows margin determinations to be made in mission mode without a loss in SerDes bandwidth. Of additional advantage is that this can be accomplished without using additional chip space on the SerDes receiver 320, which can cause low pass filtering due to parasitic capacitance, and without expanding the size of the receiver 320.

The embodiment illustrated in FIG. 3, and others, will now be described in greater detail. The transmitter 310 receives a parallel data stream 302 which it serializes and transmits as a serial data stream 304 to the receiver 320. Serializing may involve multiplexing the parallel streams of data into a single stream of data. Serialization may involve increasing the clock speed such that the serial data stream 304 clock speed is greater than the parallel data stream 302 clock speed. The transmitter 310 may be responsible for receiving a clock signal and/or a control signal along with the parallel data stream 302. The transmitter 310 also transmits the clock signal and/or the control signal along with the serial data stream 304 to the receiver 320. In some embodiments the clock and/or control signals can be embedded in the serial data stream 304 or can be transmitted to the receiver 320 separately.

The serial data stream 304 passes from the transmitter 310 to the receiver 320 via a serial communications link 306. The serial communications link 306 carries an analog signal representing digital data transmitted by the transmitter 310. For instance a digital 1 can be represented by a positive voltage while a digital 0 can be represented by a negative voltage. Alternatively, a digital 1 can be represented by a first positive voltage, while a digital 0 can be represented by a second positive voltage of less magnitude than the first positive voltage. The serial communications link 306 may comprise one or more mediums of communication (e.g., copper wires, fiber optics, on chip interconnects, or PCB traces to name a few non limiting examples). One or more different mediums can be used in series to make up the serial communications link 306.

The receiver 320 filters the serial data stream 304. Filtering applies any type of filter including feedback filters (e.g., a feedback equalizer), an input buffer, or a feed forward equalizer (FFE) to name three non-limiting examples. In one embodiment, the filter 330 is optional. In an embodiment, filtering applies a decision feedback equalizer (DFE). In an embodiment, filtering applies a linear filter. Filtering removes a portion of ISI allowing the receiver to make less errors when deciding whether symbols in the serial data stream 304 represent digital 1's or 0's. Cost-effective filtering often can only remove a portion of ISI, and the ISI that remains is called residual ISI. Filtering is carried out via a combinative effort of the data slicer 340, error slicer 360, adaptation module 370, and the filter 330. The result of filtering is a filtered signal 332, which is passed to the error slicer 360 and the data slicer 340. The data slicer 340 determines whether each symbol in the filtered signal 332 represents a digital 1 or a digital 0. These decisions 342 are then passed to the deserializer 350 where they are deserialized and transmitted as a parallel data stream 352. The decisions 342 are also passed to the adaptation module 370 where they are used both in filtering and in determining margin.

As previously discussed, filtering involves determining a tap sum 372. A tap sum is a sum of taps where each tap is a product of a pulse polarity and a tap weight. Pulse polarity is measured for every received pulse and tap weights are updated based upon every received pulse. Updating taps is referred to as taps adaptation and is based upon the magnitude data 362 generated by the error slicer 360. Each tap weight can be multiplied by the sign or polarity of a preceding bit and the products of these multiplications can be added to form a tap sum 372. The tap sum 372 is subtracted from symbols in the serial data stream 304 to remove a portion of ISI.

When taps are being updated, the receiver 320 can be said to be in a taps adaptation mode. When taps are not being updated, but a margin is being measured, then the receiver 320 can be said to be in a margin determination mode. In the following discussion, the taps adaptation mode will be discussed at length followed by a discussion of margin determination mode.

In taps adaptation mode the receiver 320 determines tap weights based on the magnitude data 362 from the error slicer 360 and determines tap polarities based on the decisions 342 from the data slicer 340. In particular, the error slicer 360 determines a magnitude of the symbols in the filtered signal 332 by comparing two input signals and outputting an indicator of which of the two signals is greater. Here, the first input signal is the filtered signal 332 while the second signal is a reference voltage. As the reference voltage is increased or decreased, the error slicer 360 outputs magnitude data 362 indicating whether the filtered signal 332 is larger or smaller than the reference voltage. The adaptation module 370 can control the reference voltage and can use the magnitude data to determine a magnitude of the pulses in the filtered signal 332. In an embodiment, the error slicer 360 is a comparator. For simplicity, the reference signal path is not illustrated in FIGS. 3-5. The adaptation module 370 uses the magnitude data 362 to adapt the tap weights, and then to calculate the tap sums 372 that are used in the filter 330.

In taps adaptation mode (and in margin determination mode), the data slicer 340 determines a sign of the symbols in the filtered signal 332. The data slicer 340 compares two inputs, the filtered signal 332 and a reference voltage, and outputs decisions 342 indicating whether the filtered signal 332 is greater than the reference voltage. The reference voltage can be controlled by the adaptation module 370 or other circuitry. Since, the reference voltage can be set to 0V, the decisions 342 indicate whether the filtered signal 332 is greater than or less than 0V—whether the filtered signal 332 represents a digital 1 or a digital 0. The decisions 342 are passed to the adaptation module 370 where they are used in the filtering process. The decisions 342 are also passed to the deserializer 350 where they are converted to a parallel data stream 352. The decisions 342 can take a number of forms. For instance the decision can be digital data or analog signals, to name two non-limiting examples.

The adaptation module 370 may be responsible for controlling the reference voltages to the error slicer 360 and the data slicer 340. The adaptation module 370 receives magnitude data 362 and decisions 342 and uses these to determine tap weights, tap polarity, and margin. In an embodiment, the adaptation module 370 can reside outside of the receiver 320. In other words, the adaptation module 370 can be off chip. In an embodiment, the adaptation module 370 can be remotely located from the SerDes 300. However, in the illustrated embodiment, the adaptation module 370 is within the receiver 320. The adaptation module 370 sums taps where each tap is a product of a tap weight and a tap polarity (or sign of a received pulse). The tap sum 372 is passed to the filter 330 where the filter 330 subtracts the tap sum from the serial data stream 304.

Figure 4:
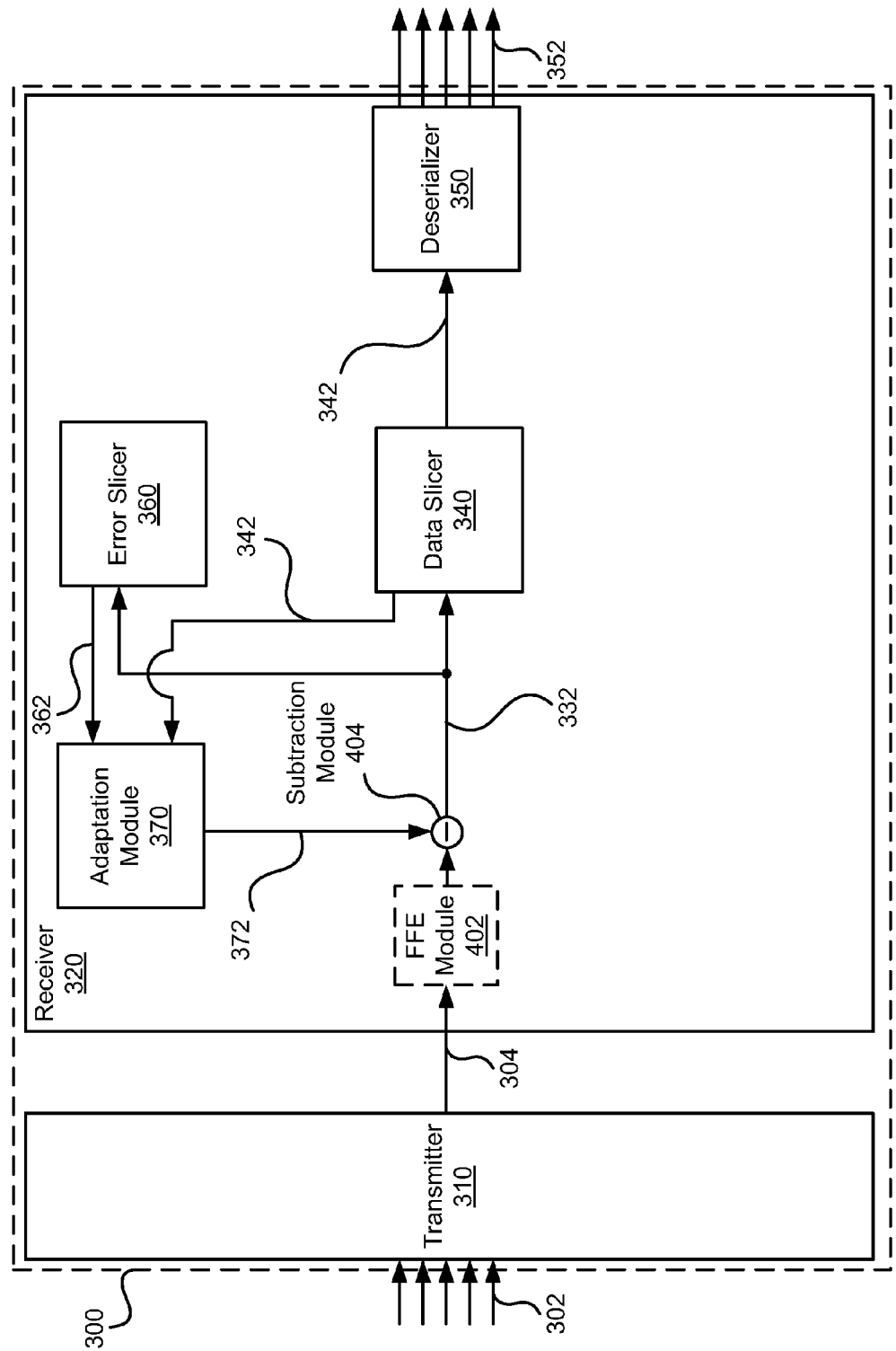
FIG. 4 illustrates another embodiment of a SerDes receiver.

FIG. 4 illustrates an embodiment of the SerDes 300 having a transmitter 310 and a receiver 320 along with a subtraction module 404 and a feed forward equalizer module 402. The subtraction module 404 receives the tap sum 372 from the adaptation module 370 as described with reference to FIG. 3. By subtracting the tap sum 372 from serial data stream 304 the subtraction module 404 converts the serial data stream 304 into the filtered signal 332. The tap sum 372 can be an analog or a digital signal representing the value of the tap sum. Alternatively, the tap sum 372 can be a voltage equal to the tap sum. The subtraction module 404 can be implemented in hardware, software or a combination of the two.

The feedback filtering discussed thus far can remove ISI from preceding pulses (post-cursor ISI). However, pulses can also overlap with pulses ahead of them. For instance, in FIGS. 1A and 1B, it can be seen that the pulse at time t spreads into time t−1 and thus would overlap with a pulse arriving at time t−1. Such, overlap is called pre-cursor ISI and is not removed via feedback filtering. Rather feed forward filtering may be used to reduce pre-cursor ISI. Hence, the receiver 220 optionally includes a feed forward equalizer (FFE) module 402. The FFE module 402 receives the serial data stream 304 and filters a portion of pre-cursor ISI before passing the signal to the subtraction module 404 for filtering of post-cursor ISI. It should be understood that the FFE module 402 is optional and that the present disclosure may function with or without the FFE module 402.

The preceding discussion has dealt with the receiver 320 in taps adaptation mode where the filter is receiving tap sums 372 calculated from updated tap weights. However, the receiver 320 can also operate in margin determination mode (or margin mode), where tap sums 372 are calculated from stored tap weights (taps adaptation is temporarily disabled, paused, or locked) and a margin for the SerDes is measured. As the receiver 320 enters margin mode, tap weights can be stored in a memory either within the adaptation module 370 or elsewhere in the receiver 320. These stored tap values can be accessed and used as if they were updated taps.

In margin mode, the adaptation module 370 continues to control aspects of the filtering process. For instance, the adaptation module 370 continues to receive decisions 342 from the data slicer 340, and the decisions 342 continue to be used to determine tap polarity. However, unlike taps adaptation mode where the decisions 342 are multiplied by updated tap weights, the decisions in margin mode are multiplied by stored tap weights retrieved from a memory.

In contrast to taps adaptation mode where the adaptation module 370 is configured to oversee filtering, in margin mode it is also configured to determine the margin. The adaptation module 370 still controls the reference voltage to the error slicer 360 and possibly the data slicer 340 if such control is needed. Instead of updating tap weights, the adaptation module 370 stores tap weights when margin mode begins and retrieves tap weights when margin mode ends. It also continues to oversee filtering by calculating tap sums 372, but does so using stored tap weights rather than updated tap weights.

Another difference in function from taps adaptation mode is that the adaptation module analyzes the magnitude data 362 and the decisions 342 to determine a margin. The following is an embodiment of a process that the adaptation module 370 can carry out to determine margin. It sets the reference voltage of the error slicer 360 to the same voltage as the reference voltage of the data slicer 340 (e.g., 0V). Since the slicers 360, 340 receive the filtered signal 332 as one of their two inputs and each have an equivalent reference voltage at this initial stage, their outputs are the same. For example if both reference voltages are at 0 volts and a symbol in the filtered signal 332 has a positive voltage than the error slicer 360 and the data slicer 340 will both produce the same outputs (magnitude data 362 and decisions 342, respectively). In an embodiment, the decisions 342 and the magnitude data 362 are formatted such that they can be compared. As such, the adaptation module 370 compares the decisions 344 and the magnitude data 362. The reference voltage of the error slicer 360 is increased while the reference voltage of the data slicer 340 remains constant (e.g., at 0V). The reference voltage of the error slicer 360 continues to increase until the adaptation module 370 observes that the magnitude data 362 and the decisions 342 are not equal. At that point, the adaptation module 370 identifies the reference voltage to the error slicer 360 as the positive voltage margin.

This process can then be repeated for the negative margin—the only difference being that the reference voltage to the error slicer 360 is decreased rather than increased. The reference voltage of the error slicer 360 is again set to equal to the reference voltage of the data slicer 340 (e.g., 0V). The reference voltage of the error slicer 360 is decreased and the adaptation module 370 compares the magnitude data 362 and the decisions 342. When the magnitude data 362 and the decisions 342 are not equal, the adaptation module 370 identifies the reference voltage to the error slicer 360 as the negative margin. Alternatively, the negative margin can be determined before the positive margin.

In margin mode, the data slicer 340 also takes on an additional role. In addition to providing digital interpretations of the symbols in the filtered signal 332 to the deserializer 350 and providing decisions 342 to the adaptation module 370 to use in calculating tap sums (both roles that the data slicer 340 plays in taps adaptation mode), the decisions 342 that the data slicer 340 generates are also used to measure positive and negative margin. As discussed above, the decisions are compared to the magnitude data 362 while the magnitude of the reference voltage to the error slicer 360 is increased. Thus, in margin mode, the data slicer 340 has three functions compared to the two that it serves during taps adaptation mode.

Figure 2A:
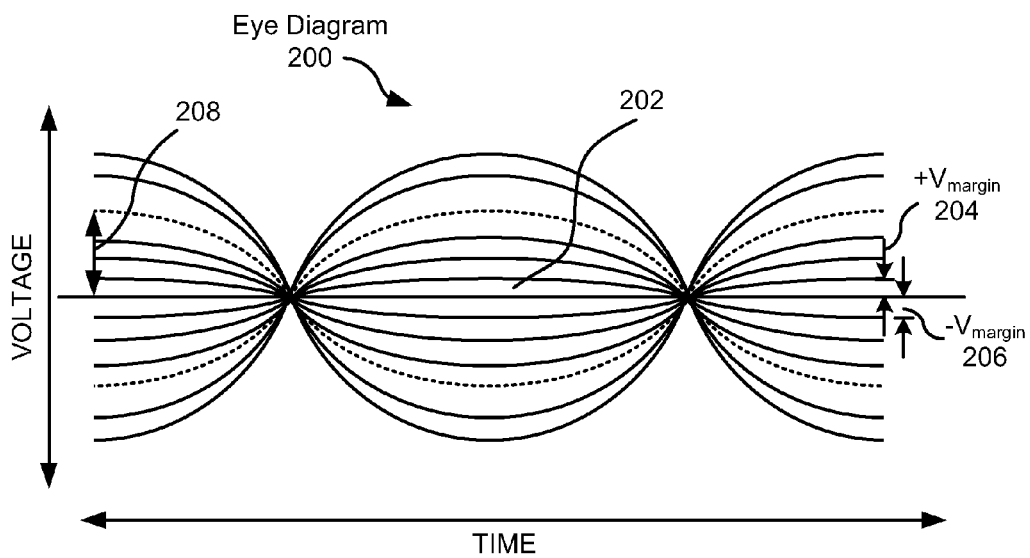
FIG. 2A illustrates an eye diagram of a serial data stream with significant noise.
Figure 2B:
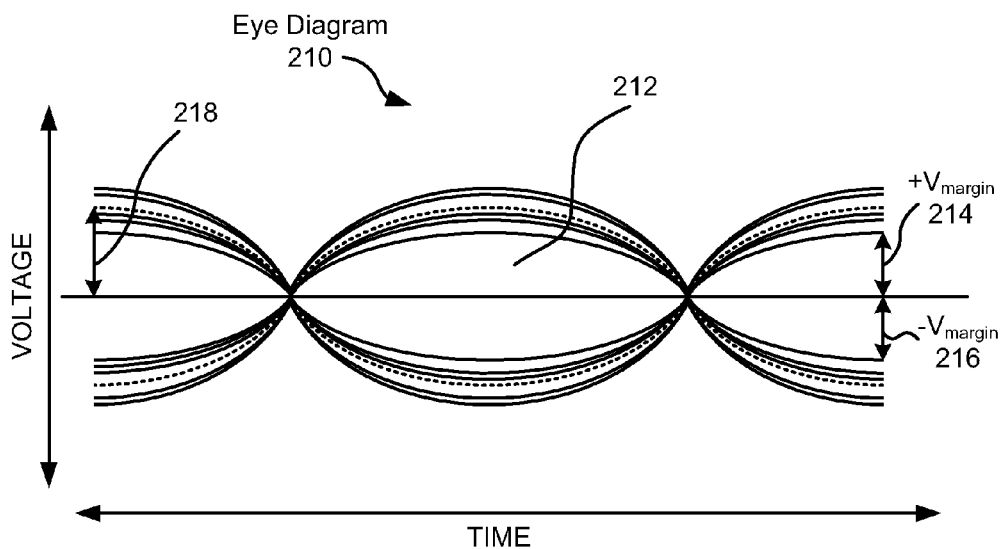
FIG. 2B illustrates an eye diagram of a serial data stream that has been filtered to reduce noise.

Now that filtering and margin determination have been discussed with reference to FIGS. 3-4, they will be discussed with reference to the eye diagrams in FIGS. 2A and 2B. FIG. 2A illustrates an eye diagram representing a serial data stream before filtering the noise that a margin measures. FIG. 2B illustrates an eye diagram representing the serial data stream after filtering. An eye diagram can be generated by, for instance, an oscilloscope, which may be used to at least visualize and qualitatively analyze noise margins. An eye diagram displays a plurality of consecutive pulses on the same voltage versus time plot. The openness of the eye, 204 and 206 for eye 202 and 214 and 216 for eye 212 indicates a signal-to-noise ratio for the signal. The wider the eye opening (e.g., 212 is wider than 202), the better the signal-to-noise ratio. If there were no noise on a signal, then the eye diagram would have a single set of waves as represented by the dotted lines in FIGS. 2A and 2B. However, noise or ISI, causes the observed amplitude of the signals to be higher or lower (solid lines) than the noise-free signals (dotted lines). Although not illustrated, jitter or timing jitter—ISI that causes pulses to be displaced in time—would cause the eyes 202, 212 to close in the horizontal dimension (time). To simplify the diagram and discussion, FIGS. 2A and 2B do not include the effects of jitter.

FIG. 2A illustrates what the serial data stream 304 of FIG. 3 might look like if viewed on an oscilloscope. Once passed through the filter 330 of FIG. 3 the eye diagram of filtered signal 332 might appear as that illustrated in FIG. 2B. In FIG. 2B the eye 212 is significantly wider than the eye 202 in FIG. 2A. Thus it can be seen that filtering the serial data stream 304 decreases noise. As the wider eye represents a greater signal-to-noise ratio, the data and error slicers 340, 360 can distinguish symbols in the filtered signal 332 more easily and thus make fewer errors. As seen in FIG. 2B, even after filtering there is some noise remaining. This is what has been referred to as residual ISI and remains because most filtering techniques are imperfect—they only remove a portion of noise. However, the filtering removes enough ISI that the slicers 340, 360 can operate at an acceptably-low bit error rate.

FIG. 2B also helps visualize what voltage margin is. The positive voltage margin is represented by the amplitude 214 and the negative voltage margin is represented by the amplitude 216. Voltage margin is thus synonymous with the signal-to-noise ratio. As noted above, the margin characterizes the noise level in the SerDes and thus the ability of the receiver to operate without making errors.

Figure 5:
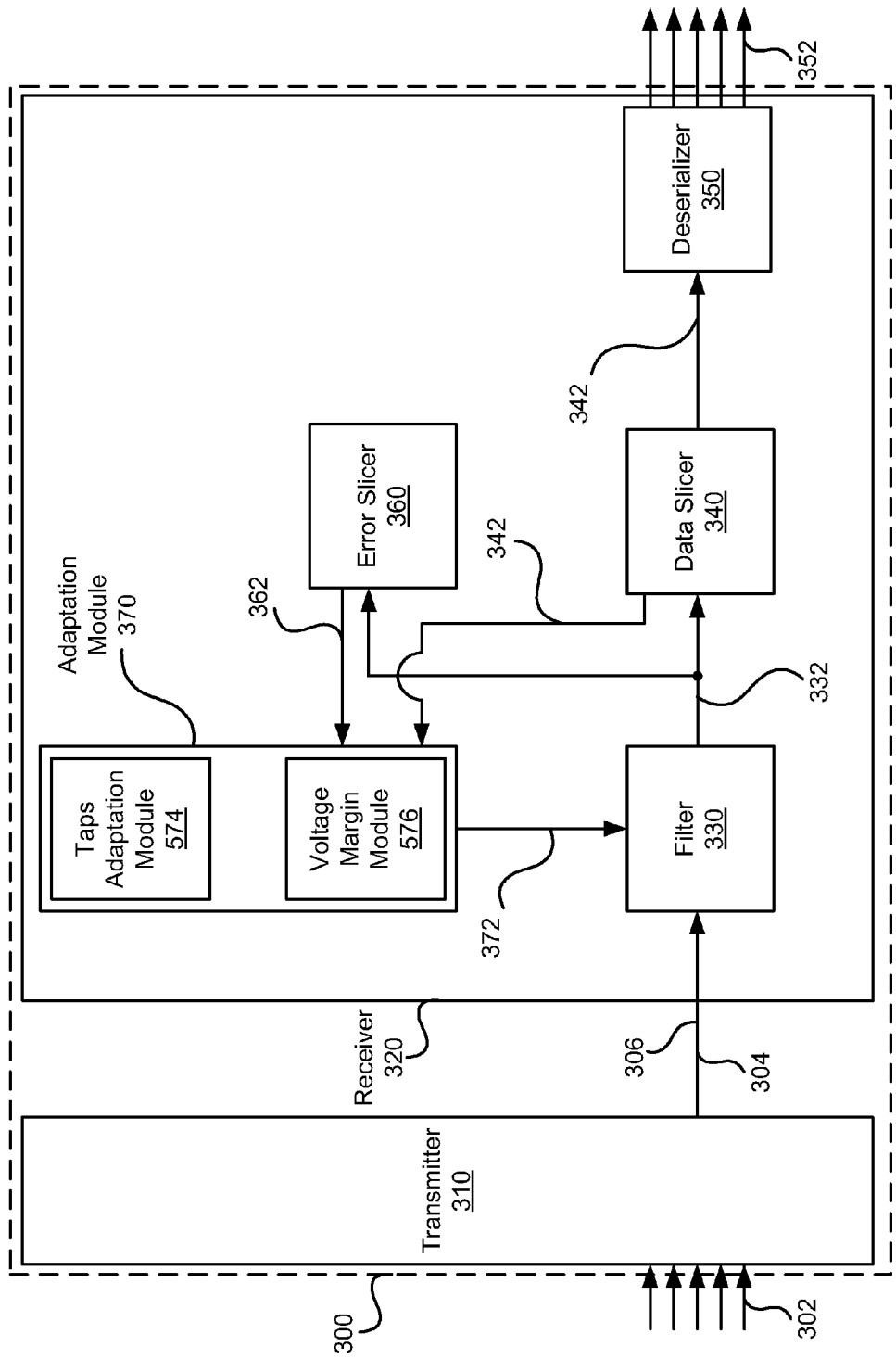
FIG. 5 illustrates another embodiment of a SerDes receiver.

FIG. 5 illustrates an embodiment of a SerDes 300 having a transmitter 310 and a receiver 320 with both a taps adaptation module 574 and a voltage margin module 576. In FIG. 5, the functions of the adaptation module 370 are distributed between the taps adaptation module 574 and the voltage margin module 576. During taps adaptation mode the taps adaptation module 574 receives decisions 342 from the data slicer 340 and magnitude data 362 from the error slicer 360. The taps adaptation module 574 controls at least the reference voltage of the error slicer 360 and possibly the reference voltage of the data slicer 340, if needed. In margin mode, the decisions 342 are passed to the voltage margin module 576. The decisions 342 are passed to both the taps adaptation module 574 and the voltage margin module 576. During margin mode the taps adaptation module 574 determines the tap sum 372 based on stored tap weights and the decisions 342.

The SerDes illustrated in FIGS. 3-5 may also include one or more encoders, decoders, and/or first-in, first-out (FIFO) components or logic blocks, none of which are illustrated for the sake of simplicity. The receiver 320 may further include circuitry or software or a combination of the two configured to retrieve a clock signal and distribute that clock signal to various portions of the receiver 320. In an embodiment, this can be a clock and data recovery module (not illustrated). The clock and data recovery (CDR) module can determine the clock signal based on the pattern of symbols in the serial data stream 304. In an alternative embodiment, the CDR module can determine the clock signal via a clock signal sent in parallel with the serial data stream 304. The CDR module can distribute the clock signal to the various receiver portions illustrated in FIGS. 3-5. Additionally, the CDR module may work in concert with the adaptation module 370 and may require disabling during margin mode.

Figure 6:
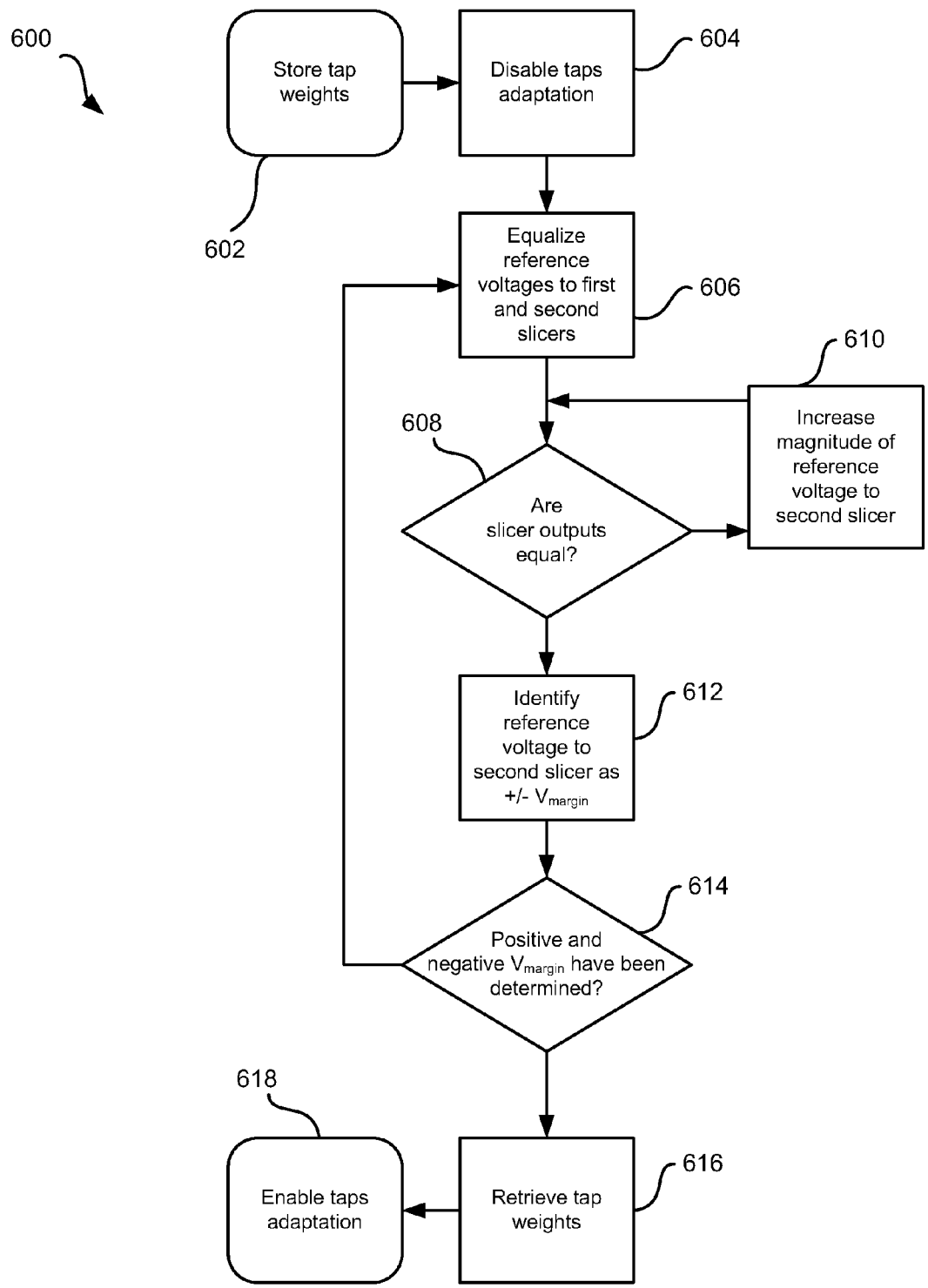
FIG. 6 illustrates a method of measuring a voltage margin for a SerDes.

FIG. 6 illustrates a method 600 of measuring a voltage margin for a SerDes. Generally the method 600 involves comparing a filtered analog pulse stream to a first reference voltage. This can be carried out for instance, via a first slicer. The method 600 also involves comparing the filtered analog pulse stream to a second reference voltage that is increasing in magnitude (increasing or decreasing in voltage), but originally started at the same voltage as the first reference voltage. The method 600 further includes identifying the second reference voltage as a voltage margin when the comparing operations produce unequal outputs. The method 600 can be repeated to determine both the positive and negative voltage margin, whichever is not determined in a first iteration of the method. However, there is no requirement that both margins be determined.

In particular, the illustrated method 600 may include a store tap weights operation 602 and a disable taps adaptation operation 604 in which taps adaptation stops or locks, and the current tap weights are stored in a memory. The order of these two operations is reversible and their execution can overlap. Once tap weights are stored and taps adaption is disabled, reference voltages to a first and second slicer can be equalized via equalize operation 606. The method 600 then determines whether the outputs of the slicers are equal, via decision 608. If they are not, then the method increases the magnitude (an increase or decrease in voltage away from 0V) of the reference voltage to the second slicer (e.g., an error slicer) in an increase reference voltage magnitude operation 610. The slicer outputs are again compared via decision 608. Increase operation 610 and decision 608 continue to loop until the decision 608 finds that the slicer outputs differ. The method 600 then identifies the reference voltage to the second slicer as a voltage margin (positive or negative depending upon whether the increase operation 610 was increasing or decreasing the reference voltage). The method 600 then determines whether both a positive and negative margin have been determined via decision 614. If either margin has not been determined, then the method loops back through operations 606, 610, 612, and decisions 608 and 614. It should be noted that in an embodiment, the method 600 may only determine either a positive or a negative margin. Thus, decision 614 is not required. When both margins have been determined, the method 600 retrieves the tap weights from the memory via retrieve operation 616 and enables the taps adaption via the enable operation 618. The order of operations 616 and 618 can be reversed or their execution can overlap.

Figure 7:
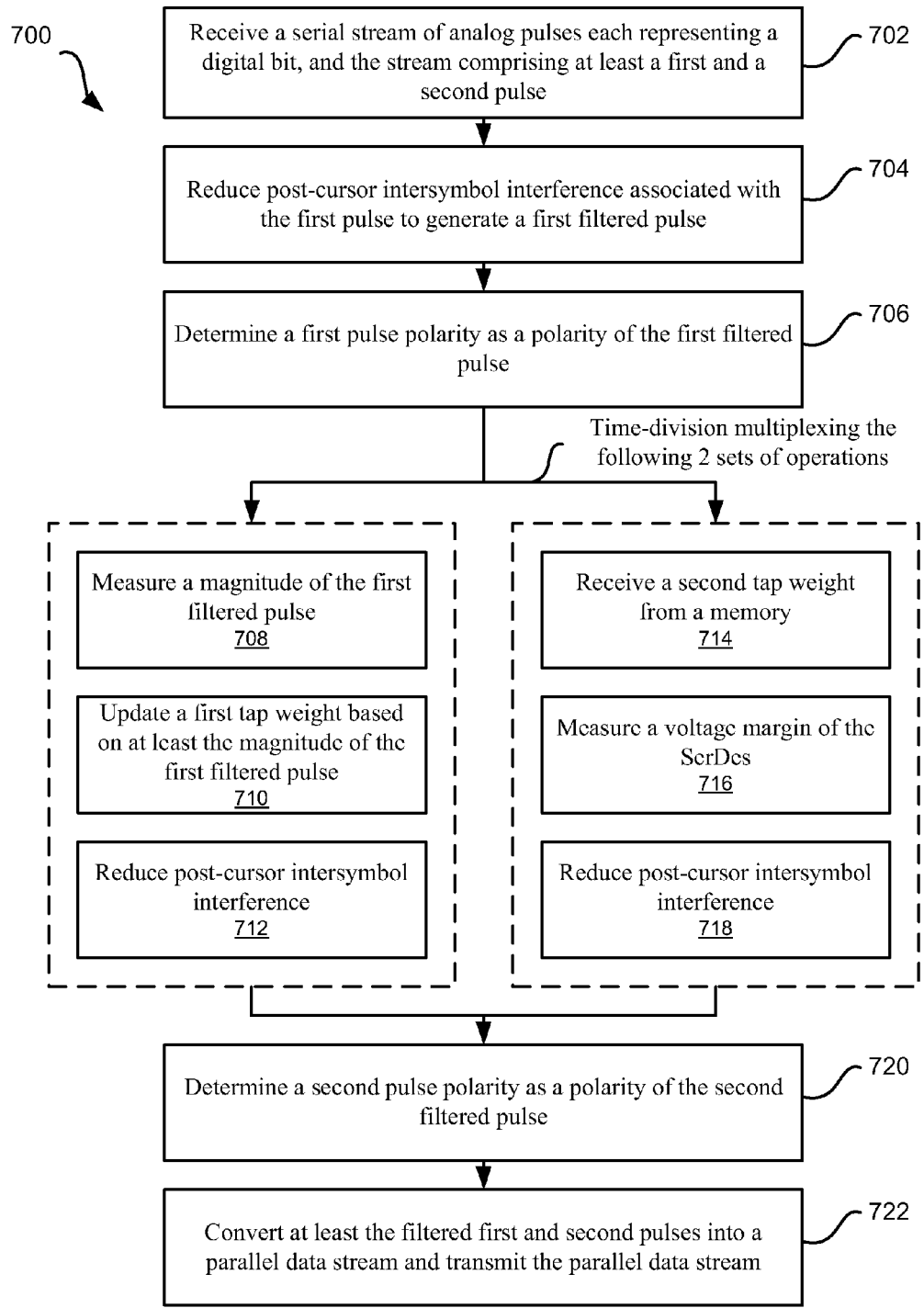
FIG. 7 illustrates an embodiment of a method for operating a SerDes receiver.

FIG. 7 illustrates an embodiment of a method 700 for operating a SerDes receiver. The method 700 includes receiving a serial stream of analog pulses each representing a digital bit via a receiver operation 702. The stream may comprise at least a first and second pulse. The method 700 reduces post-cursor intersymbol interference associated with the first pulse to generate a first filtered pulse via reduce operation 704. The method 700 determines a first pulse polarity as a polarity (or sign) of the first filtered pulse via determine operation 706. The method 700 time-division multiplexes the following two sets of operations: (1) measuring a magnitude of the first filtered pulse (measure operation 708), updating a first tap weight based on at least the magnitude of the first filtered pulse (update operation 710), and reducing post-cursor intersymbol interference associated with the second pulse using the first pulse polarity and the first tap weight (reduce operation 712); and (2) retrieving a second tap weight from a memory (retrieve operation 714), measuring a voltage margin of the SerDes (measure operation 716), and reducing the post-cursor intersymbol interference associated with the second pulse using the first pulse polarity and the second tap weight (reduce operation 718). Time-division multiplexing is herein used to mean that these two sets of operations operate in consecutive non-overlapping periods of time on a SerDes receiver. The method 700 further includes determining a second pulse polarity as a polarity of the second filtered pulse via determine operation 720. The method 700 also includes converting at least the filtered first and second pulses into a parallel data stream and transmitting the parallel data stream via convert and transmit operation 722.

Figure 8:
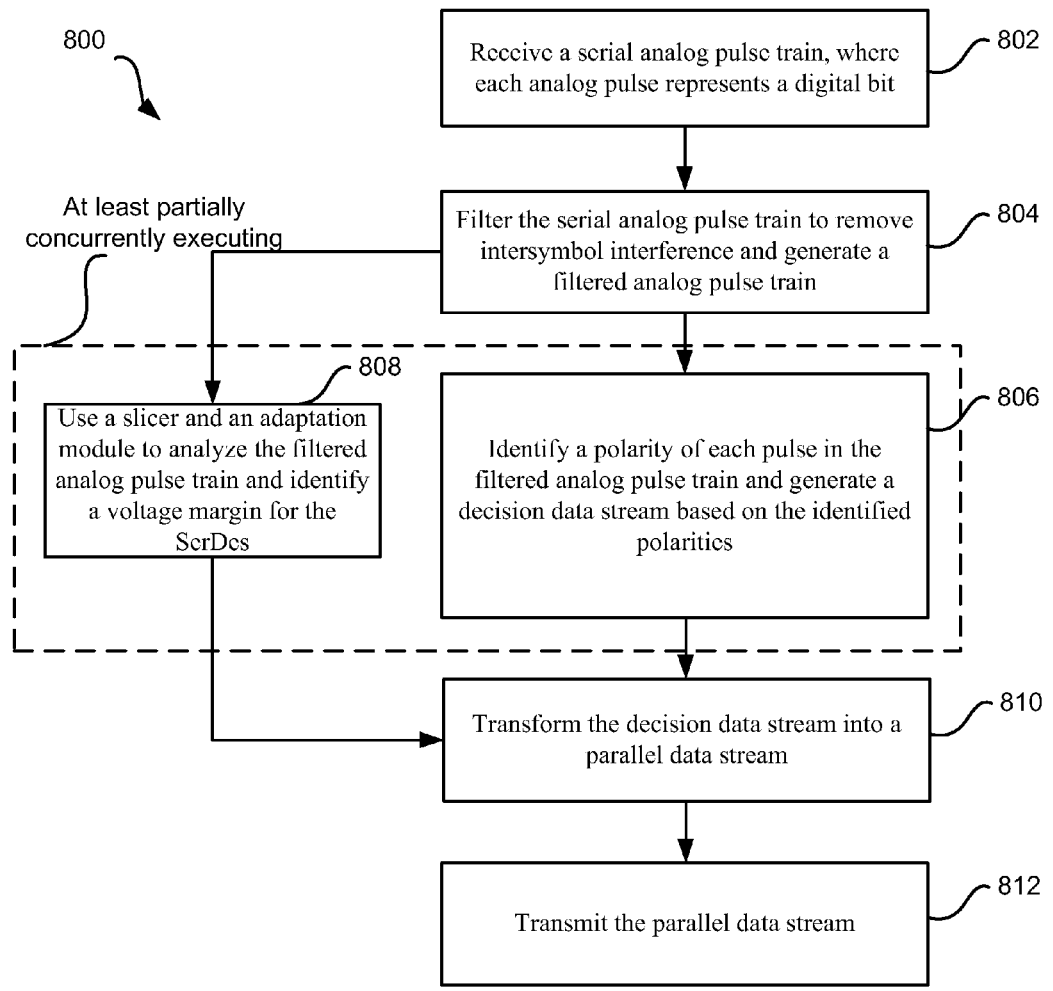
FIG. 8 illustrates an embodiment of a method for operating a SerDes receiver.

FIG. 8 illustrates an embodiment of a method 800 for operating a SerDes receiver. The method 800 includes receiving a serial analog pulse train via receive operation 802. The analog pulse train includes a plurality of voltage pulses having substantially the same magnitude but either a positive or negative polarity (e.g., positive indicating a digital 1, negative indicating a digital 0). The method 800 filters the serial analog pulse train using a feedback filter such as a decision feedback equalizer (DFE) via filter operation 804. The filtering removes a portion of intersymbol interference and generates a filtered analog pulse train. The method 800 identifies a polarity (or sign) of each pulse in the filtered analog pulse train and generates a decision data stream based on the identified polarities via identify operation 806. Concurrently with identification of at least some of the pulses, the method 800 uses a slicer and an adaptation module to analyze the filtered analog pulse train via analyze operation 808. This analysis identifies a voltage margin for the SerDes. This voltage margin identification only occurs for short periods of time, while the identification of pulse polarity is an ongoing process. However, at least for short periods of time, both the use operation 808 and the identify operation 806 operate at the same time. The decision data stream is deserialized or transformed into a parallel data stream via transform operation 810 and transmitted via transmit operation 812.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed:

1. A method of measuring a voltage margin for a serializer/deserializer, the method comprising:
    comparing a filtered analog pulse stream to a first reference voltage;
    comparing the filtered analog pulse stream to a second reference voltage that is increasing in magnitude, the second reference voltage being initially equal to the first reference voltage; and
    identifying a magnitude of the second reference voltage as a voltage margin when the comparing operations produce unequal outputs.

2. The method of claim 1, wherein the first and second reference voltages are initially equal to 0V.

3. The method of claim 2, wherein the second reference voltage is increased when determining a positive voltage margin.

4. The method of claim 3, wherein the second reference voltage is decreased when determining a negative voltage margin.

5. The method of claim 1, wherein the first comparing is performed by a first slicer.

6. The method of claim 5, wherein the second comparing is performed by a second slicer.

7. The method of claim 1, wherein the filtered analog pulse stream is created by application of a feedback filter.

8. The method of claim 7, wherein the feedback filter is a decision feedback equalizer.

9. The method of claim 8, wherein the decision feedback equalizer subtracts a tap sum from a serial data stream transmitted by a SerDes transmitter.

10. A method of measuring a voltage margin for a serializer/deserializer, the method comprising:
    comparing a filtered analog pulse stream to a first reference voltage;
    comparing the filtered analog pulse stream to a second reference voltage that is increasing in magnitude, the second reference voltage being initially equal to the first reference voltage; and identifying a magnitude of the second reference voltage as a voltage margin when the comparing operations produce unequal outputs;

further comprising storing tap weights in a memory before identifying the voltage margin.

11. The method of claim 10, further comprising disabling taps adaptation before identifying the voltage margin.

12. The method of claim 11, further comprising retrieving the tap weights from the memory after identifying the voltage margin.

13. The method of claim 12, further comprising enabling the taps adaptation after identifying the voltage margin.

14. A serializer/deserializer (SerDes) receiver comprising:
a first comparison module configured to compare a filtered analog pulse stream to a first reference voltage and generate a first output;
a second comparison module configured to compare the filtered analog pulse stream to a second reference voltage that is increasing in magnitude and generate a second output, the second reference voltage initially equal to the first reference voltage; and
an adaptation module configured to identify a voltage margin of the SerDes, wherein the voltage margin is a magnitude of the second reference voltage at the point when the first and second outputs are unequal.

15. The SerDes of claim 14, wherein the adaptation module comprises a voltage margin module configured to compare the first and second outputs and identify a voltage margin of the SerDes.

16. The SerDes of claim 15, wherein the adaptation module comprises a taps adaptation module configured to perform taps adaptation and determine tap sums.

17. The SerDes of claim 14, further comprising a memory configured to store tap weights before identifying the voltage margin.

18. The SerDes of claim 17, further comprising disabling taps adaptation before identifying the voltage margin.

19. The SerDes of claim 18, further comprising retrieving the tap weights from the memory after identifying the voltage margin.

20. The SerDes of claim 19, further comprising enabling the taps adaptation after identifying the voltage margin.

* * * * *

UNITED STATES PATENT AND TRADEMARK OFFICE
CERTIFICATE OF CORRECTION

PATENT NO. : 8,599,909 B2
APPLICATION NO. : 12/850535
DATED : December 3, 2013
INVENTOR(S) : Doblar et al.

Page 1 of 1

It is certified that error appears in the above-identified patent and that said Letters Patent is hereby corrected as shown below:

In the Specification

In column 2, line 4, delete "h0" and insert -- h1 --, therefor.

Signed and Sealed this
Third Day of June, 2014

Michelle K. Lee
*Deputy Director of the United States Patent and Trademark Office*